US011479368B2

(12) United States Patent
Sohmshetty et al.

(10) Patent No.: US 11,479,368 B2
(45) Date of Patent: Oct. 25, 2022

(54) SYSTEMS, METHODS, AND DEVICES FOR VEHICLE INTEGRATION OF UNMANNED AIRCRAFT SYSTEMS

(71) Applicant: Ford Global Technologies, LLC, Dearborn, MI (US)

(72) Inventors: Raj Sohmshetty, Canton, MI (US); James Carthew, Oakland, CA (US); Sandeep Raj Gandiga, Santa Clara, CA (US); Richard Wykoff, Commerce Township, MI (US); Michael Azzouz, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 913 days.

(21) Appl. No.: 16/243,749

(22) Filed: Jan. 9, 2019

(65) Prior Publication Data

US 2020/0216196 A1  Jul. 9, 2020

(51) Int. Cl.
*B64F 1/22* (2006.01)
*B60P 3/11* (2006.01)

(52) U.S. Cl.
CPC ............... *B64F 1/225* (2013.01); *B60P 3/11* (2013.01)

(58) Field of Classification Search
CPC .. B64F 1/225; B64F 3/00; B64F 1/007; B60P 3/11; B64C 2201/18; B64C 2201/208; B64C 39/022; B64C 39/024; B60R 11/00
See application file for complete search history.

(56) References Cited

U.S. PATENT DOCUMENTS

| 9,817,405 | B2 * | 11/2017 | Li | G06Q 10/083 |
| 10,040,576 | B1 * | 8/2018 | Rosenberg | B64F 1/10 |
| 2009/0115232 | A1 * | 5/2009 | Dennis | A47C 15/004 |
| | | | | 297/217.3 |

(Continued)

FOREIGN PATENT DOCUMENTS

| CA | 2750638 A1 * | 2/2013 | F03D 5/00 |
| CN | 103914076 A * | 7/2014 | G08G 5/0026 |

(Continued)

OTHER PUBLICATIONS

Janousek, et al., "Precision landing options in unmanned aerial vehicles," 2018 International Interdisciplinary PhD Workshop (IIPhDW), Swinoujscie, 2018, pp. 58-60. doi: 10.1109/IIPHDW.2018.8388325.

*Primary Examiner* — Behrang Badii
*Assistant Examiner* — Jalal C Coduroglu
(74) *Attorney, Agent, or Firm* — Brandon Hicks; Eversheds Sutherland (US) LLP

(57) ABSTRACT

Systems and methods are disclosed for vehicle integration of unmanned aircraft systems (UASs). Example methods may include coupling a landing dish of a vehicle integrated UAS to a ground station assembly; positioning the landing dish and the ground station assembly into a portion of a vehicle and a capping member of the vehicle integrated UAS; and coupling the landing dish to the capping member of the vehicle integrated UAS. In various embodiments, the vehicle integrated UAS may be configured to send and receive information (e.g., route information, power information, status information, etc.) between unmanned aerial vehicles (UAV) associated with the UAS to device(s) of a vehicle.

16 Claims, 9 Drawing Sheets

(56) References Cited

U.S. PATENT DOCUMENTS

| | | | |
|---|---|---|---|
| 2013/0052014 A1* | 2/2013 | Kelly | F03D 5/04 |
| | | | 416/66 |
| 2016/0001883 A1* | 1/2016 | Sanz | B64C 39/024 |
| | | | 244/17.23 |
| 2016/0169772 A1* | 6/2016 | Olmedo | G01N 1/08 |
| | | | 73/864.32 |
| 2016/0200437 A1* | 7/2016 | Ryan | B64C 39/022 |
| | | | 244/99.2 |
| 2017/0029134 A1* | 2/2017 | Lee | B64C 39/024 |
| 2017/0129603 A1* | 5/2017 | Raptopoulos | B64C 39/024 |
| 2020/0239161 A1* | 7/2020 | Carthew | B64F 1/364 |
| 2021/0047055 A1* | 2/2021 | Lee | B64F 1/005 |
| 2021/0300591 A1* | 9/2021 | Tian | B64F 1/007 |

FOREIGN PATENT DOCUMENTS

| | | | | |
|---|---|---|---|---|
| CN | 104442452 A * | 3/2015 | | B64D 47/08 |
| CN | 104442452 A | 3/2015 | | |
| RU | 2451826 C2 * | 5/2012 | | F03D 13/20 |
| RU | 2615549 C2 * | 4/2017 | | F03D 5/04 |
| WO | 2016/059555 A1 | 4/2016 | | |
| WO | WO-2016059555 A1 * | 4/2016 | | B60L 11/1833 |

\* cited by examiner

SYSTEMS, METHODS, AND DEVICES FOR VEHICLE INTEGRATION OF UNMANNED AIRCRAFT SYSTEMS

TECHNICAL FIELD

The disclosure relates generally to unmanned aircraft systems (UASs) and more particularly relates to systems, methods, and devices for integrating UASs with vehicles.

BACKGROUND

Unmanned aerial vehicles ("UAVs" or "drones") are being routinely used in search and rescue, policing, facilities monitoring, package delivery, and other applications. As the capabilities of drones improve and FAA regulations become friendlier, drone use is likely to continue to grow. In anticipation of this, auto OEMs are incorporating drones into their vehicles. Such integration may enhance the utility of the drones and improve the appeal of the vehicles for drone users.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
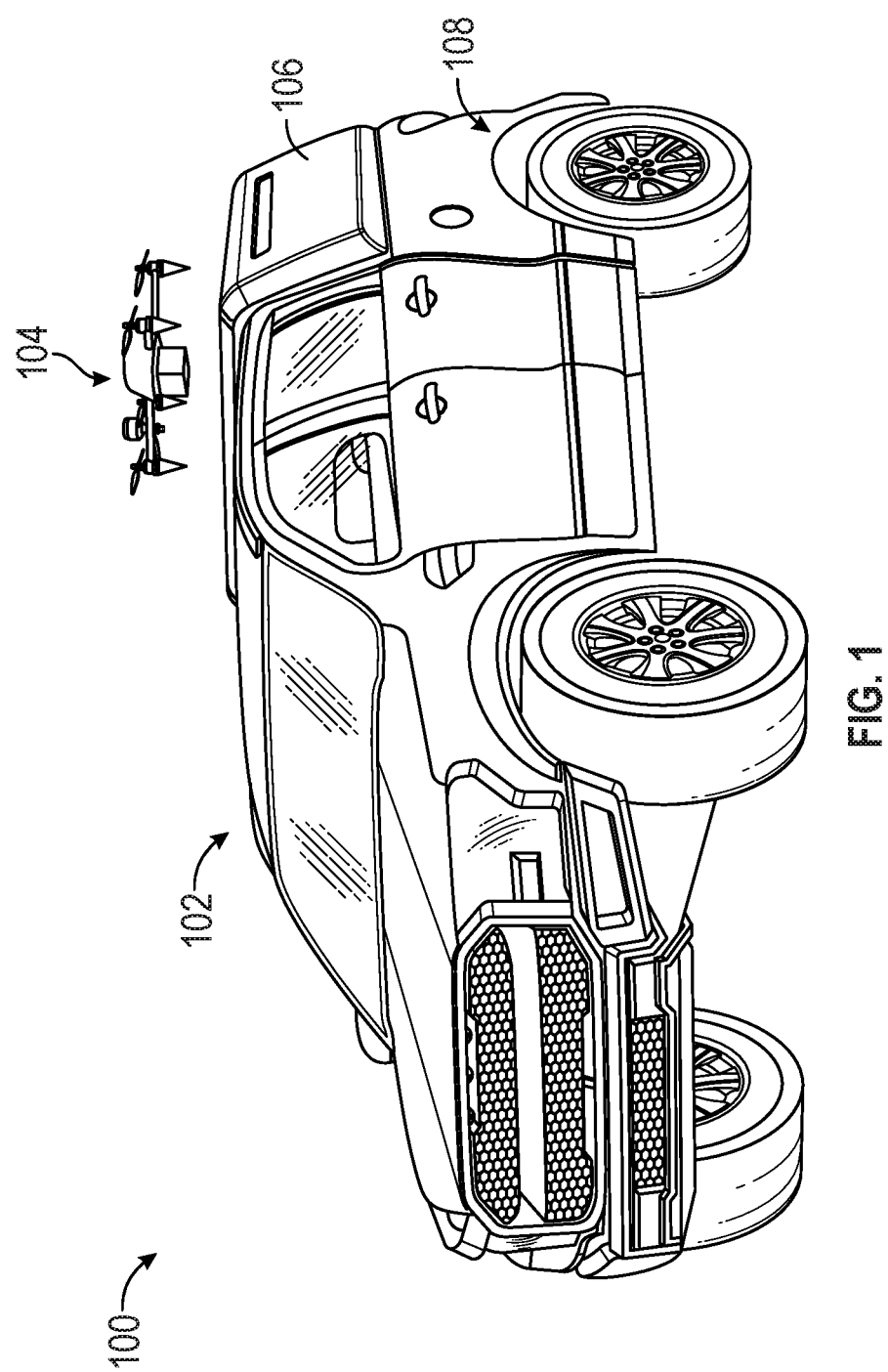
FIG. 1 is a perspective view of a vehicle integrated unmanned aircraft system on a vehicle in accordance with one or more embodiments of the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

In various embodiments, the disclosure is directed to systems, methods, and apparatuses for integrating an unmanned aircraft system with vehicles (e.g., pickups, trucks, cars, buses, and/or the like). In some embodiments, a vehicle integrated unmanned aircraft system (herein referred to as "UAS" or "vehicle integrated UAS") may include one or more unmanned aerial vehicles (UAVs) (also referred to as drones herein), which may be configured to communicate with the vehicle's electronic systems, one or more vehicle devices, and/or user devices (e.g., mobile phones, laptops, tablets, combinations thereof, and/or the like). In particular, the UAVs may be configured to ingrate electronically and mechanically with the vehicle using the vehicle integrated UAS, as described below.

In one embodiment, the vehicle integrated UAS may include a portable tethering and landing mechanism that may be configured to mount on at least a portion of a vehicle (e.g., a truck bed) and connect to the UAVs (e.g., in order to transmit and receive information and/or to provide power to the UAVs). In another embodiment, the vehicle and/or devices associated with the vehicle may include a software module including computer-executable instructions (e.g., computer-executable instructions stored on a non-transitory computer-readable medium) that can be configured to cause one or more processors of the vehicle's electronic systems, one or more vehicle devices, and/or user devices to determine that a UAV of a UAS has landed and/or attached to the vehicle or taken off from the vehicle. Further, the software module may be configured to cause one or more processors of the vehicle's electronic systems, one or more vehicle devices, and/or user devices to communicate with the UAVs that are mounted on the vehicle integrated UAS.

In some instances, embodiments of the disclosure may include a UAS system that further includes a landing dish assembly (e.g., including a landing dish) to allow for a mechanical and electronic platform on which UAVs may be coupled. In particular, the landing mechanism may provide a designated area for the UAV to be transported on the back of a vehicle in a secure manner. In another embodiment, the landing mechanism may be further configured to operate with a tether that may serve to secure the UAV. Additionally, the landing mechanism and/or the tether may be configured to communicate with and/or provide power to the UAV via one or more power and/or communications connections (e.g., cables) as the UAV performs one or more actions (e.g., delivery missions, reconnaissance missions, and the like).

In various aspects, embodiments of the disclosure include, a landing dish assembly associated with a vehicle and one or more UAVs of a UAS that may be configured to operate on a network (wired or wireless network, or both). In another embodiment, one or more devices of the vehicle or devices associated with a vehicle such as a vehicle's infotainment system may communicate with various portions of the vehicle integrated UAS, and may serve to detect the presence of UAVs embarking on and departing from the landing dish assembly, for example, using one or more sensors (e.g., motion sensors, optical sensors, and the like), one or more electronic connections, and the like. Moreover, the landing dish assembly and/or the UAVs of the vehicle integrated UAS may notify the vehicle devices (e.g., the infotainment system of the vehicle) and/or user devices (e.g., a mobile phones in proximity to the vehicle) regarding various information related to the UAVs, including, but not limited to, the status of a UAVs embarking and departing from the landing dish assembly, mission-related data of the UAVs, the power status of the UAVs, combinations thereof, and/or the like.

In another embodiment, as noted, the infotainment system or other vehicle device(s) may detect information related to the landing dish assembly (e.g., the presence of the landing dish assembly and its operational status) and/or UAVs of the UAS (e.g., the presence of a given UAV and its operational status). In one embodiment, the information may be detected based at least in part on scanning for presence and/or beacon messages transmitted to and from the UAV by the vehicle device(s).

In another embodiment, a vehicle device(s) and/or the infotainment system of the vehicle may include an application that may communicate with (e.g., send and receive data packets) with a given UAV to recognize the compatibility of a given UAV with the vehicle and devices of the vehicle. Further, the application may serve to enable one or more users to interact with (e.g., control and send and receive data to and from) a given UAV, for example, via a user device, a vehicle device, the infotainment system (e.g., using a human-machine interface, HMI, of the infotainment system), combinations thereof, and/or the like.

In various aspects, embodiments of the disclosure may enable "a plug and play" type installment and operation of vehicle integrated unmanned aerial vehicles. Further, the UAVs may be part of an unmanned aircraft system, which may allow for standalone and vehicle integrated operation. Moreover, embodiments of the disclosure may allow for operation that is compatible with multiple different ground vehicle makes and models, and/or various UAS vendors.

In various embodiments, embodiments of the disclosure may include the integration of UASs with a vehicle infotainment system of a vehicle, if available. Further, embodiments of the disclosure may lead to improved space usage as compared with a non-integrated UAS including, for example, UAVs launched from a portion of the vehicle such as a truck bed. In another embodiment, embodiments of the disclosure may enable the continuous powering of the UAVs of the UAS through a tethering wire, for example, using a vehicle's internal combustion engine, a vehicle's battery system in combination with an inverter, external ground-based power supplies, and the like. Moreover, embodiments of the disclosure generally serve to improve vehicle computing, connectivity, and sensor integration with the UAVs of the UAS.

In various embodiments, the vehicle integrated UAS may include tethered UAVs. That is, the UAV may tether to the vehicle or component of the vehicle. In another embodiment, the UAVs described herein may be used by one or more entities including, but not limited to, border patrol, firefighters, police, armed forces, and the like. Embodiments of the disclosure may include UAV applications in various fields including, but not limited to, surveillance applications, emergency communications applications, fire detection, search and rescue applications, providing network connectivity (e.g., Internet connectivity) in remote areas, cellular coverage applications, crowd control applications, traffic monitoring applications, vehicle parking optimization, television broadcasting applications, emergency lighting applications, disaster recovery applications, and the like. In other embodiments, the UAVs of the vehicle integrated UAS may be untethered, for example, the UAVs of the UAS may need to be detached from the ground vehicle to deploy closer to a location of use.

In various embodiments, the vehicle integrated UASs may be vehicle agnostic. That is, the vehicle integrated UASs may be configured to have a common mounting and/or installation interface and installation and use procedure for a variety of vehicles of different sizes and models (e.g., different pickup truck models and makes) in order to increase usability, conformity, management, and to reduce engineering costs.

In various embodiments, the vehicle integrated UASs may be UAV agnostic, that is, the vehicle integrated UASs may be modular and allow for a plug-and-play of UAVs from different vendors. In particular, embodiments of the disclosure may be used in connection with a defined standard, the standard may include definitions for physical and electronic integration of a UAS to a given portion of a vehicle (e.g., a landing dish assembly of the vehicle).

In various aspects, embodiments of the disclosure describe techniques for improving landing accuracy and safety. For example, in one embodiment, the UAVs of a UAS may be configured to land on a landing dish assembly including a dish-like member including guides integrated into propeller guards of the UAVs to allow for a reliable and repeatable embarking and debarking of the UAVs.

Figure 2:
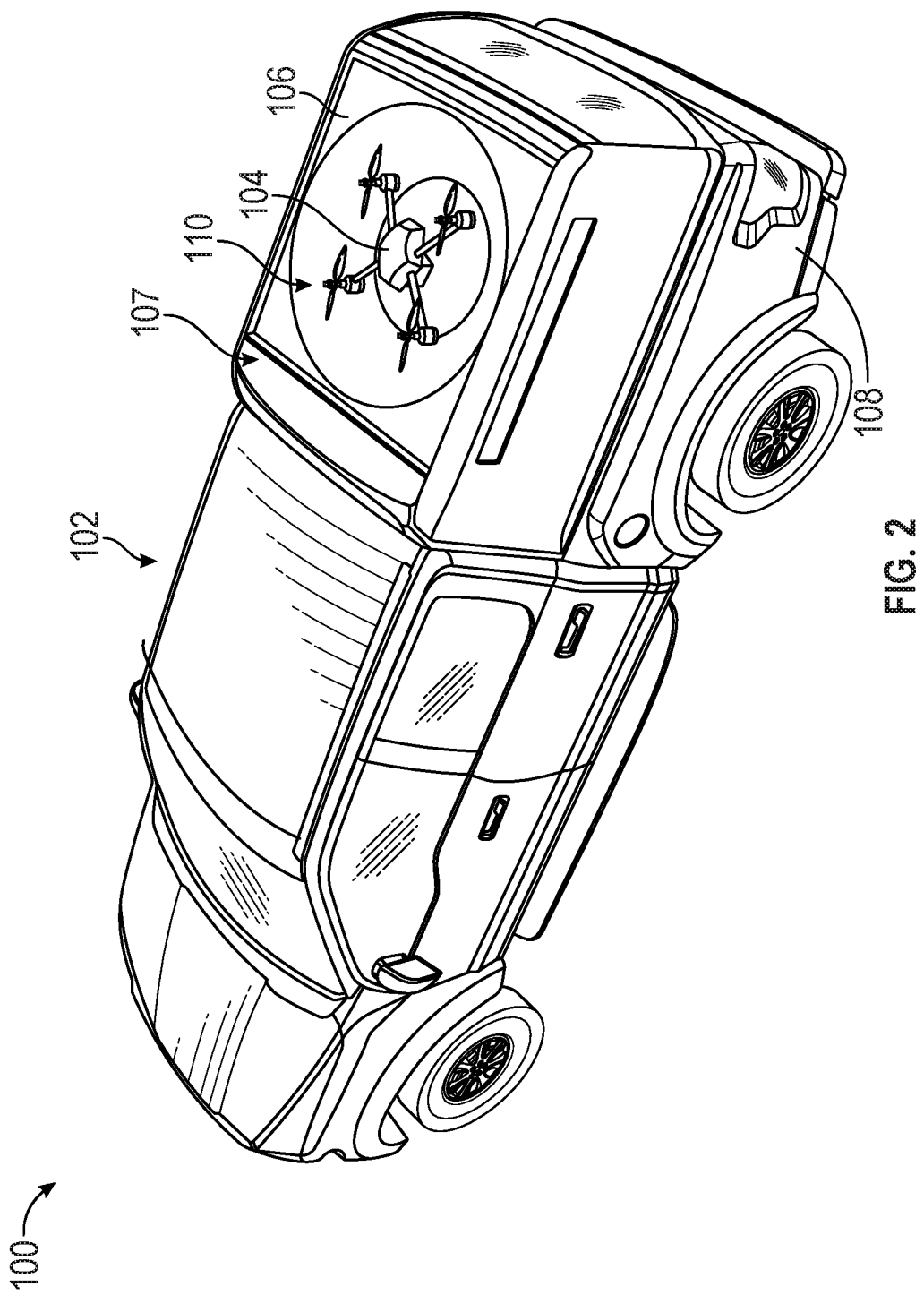
FIG. 2 is an upper perspective view of the vehicle integrated unmanned aircraft system on a vehicle in accordance with one or more embodiments of the disclosure.

In some embodiments, as shown in FIGS. 1-2, a vehicle integrated unmanned aircraft system 100 (herein referred to as "UAS 100" or "vehicle integrated UAS 100") is incorporated onto a vehicle 102. While the vehicle 102 depicted is a pickup truck, any suitable vehicle may be used in connection with various embodiments of the disclosure. In particular, the vehicle may include, but not be limited to, a bus, an SUV, an automobile, a pickup truck, a truck, a bus, a train, a trolley, a tram, a golf cart, an autonomous vehicle, an electric vehicle, an all-terrain vehicle, a watercraft, a ship, a boat, a yacht, an aircraft, a fixed-wing aircraft, a helicopter, an airship, and/or the like. Moreover, the vehicle may include a portion that is attachable and detachable, such as a towable trailer, a travel trailer, a camper, a construction trailer, a semi-trailer, combinations thereof, and/or the like.

In some embodiments, the vehicle 102 may be an autonomous vehicle. In this manner, the autonomous vehicle may include a variety of sensors that may aid the vehicle in navigation, such as radio detection and ranging (radar), light detection and ranging (lidar), cameras, magnetometers, ultrasound, barometers, and the like. In one embodiment, the sensors and other devices of the vehicle 102 may communicate over one or more network connections, Examples of suitable network connections include a controller area network (CAN), a media oriented system transfer (MOST), a local interconnection network (UN), a cellular network, a WiFi network, and other appropriate connections such as those that conform with known standards and specifications (e.g., one or more Institute of Electrical and Electronics Engineers (IEEE) standards, and the like).

Figure 3:
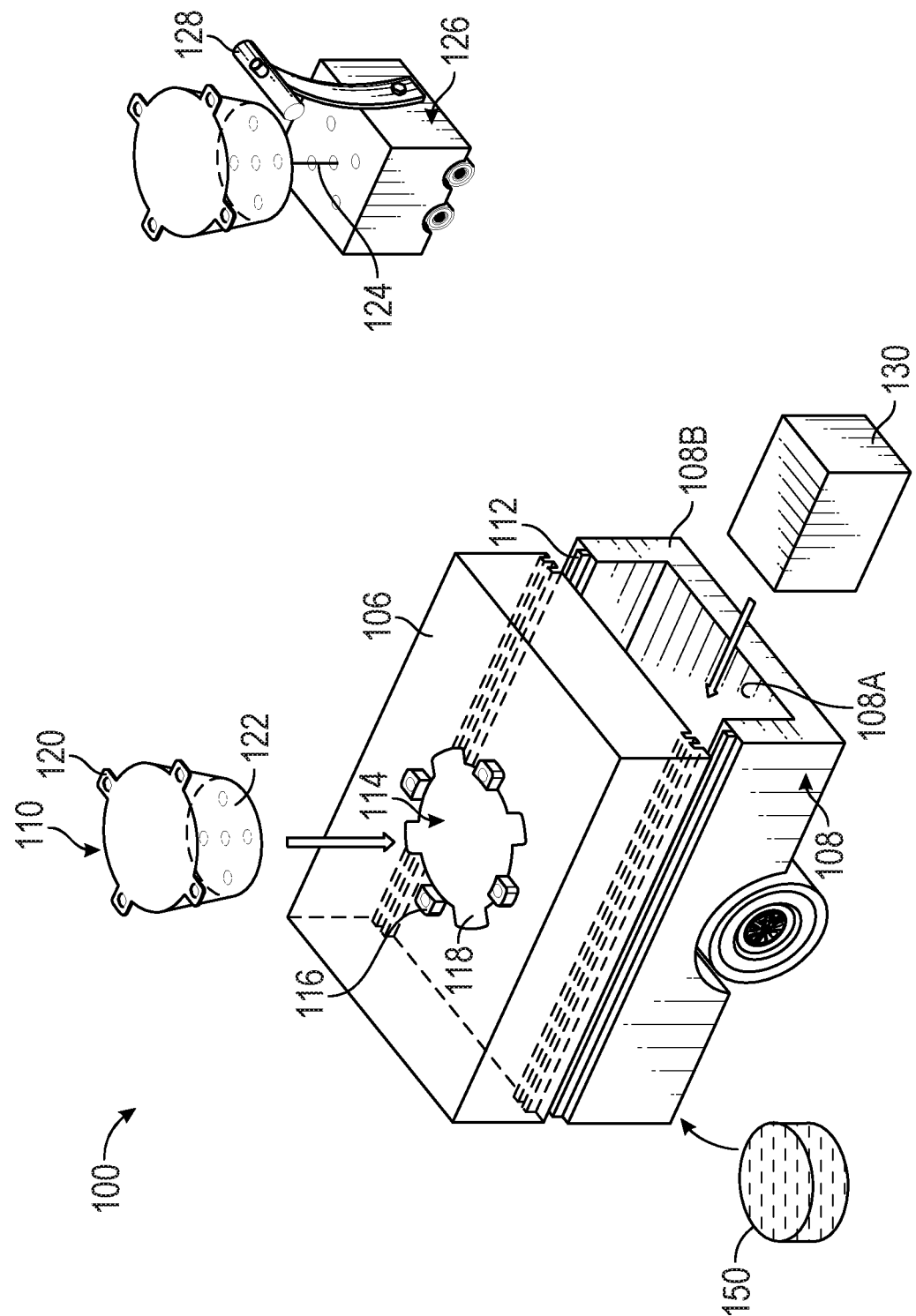
FIG. 3 is an upper perspective exploded view of the vehicle integrated unmanned aircraft system in accordance with one or more embodiments of the disclosure.

In some embodiments, as shown in FIGS. 1-2, the UAS 100 includes a box cap 106. In particular, the box cap 106 may be configured to mount with at least a portion of the vehicle 102. For example, the box cap 106 may include a mechanical coupling apparatus or feature. In some instances, the box cap 106 may include a coupling mechanism 112 (e.g., as shown in FIG. 3). In some instances, the coupling mechanism 112 may be a tongue and groove structure configured to complement a similar structure disposed on the vehicle 102. Moreover, in various embodiments, the box cap 106 may include a landing and/or takeoff module (e.g., a landing dish assembly 110 or another platform). In particular, the landing dish assembly may include a landing dish 122. In some instances, the landing dish assembly 110 may include multiple landing dishes and other components associated therein. In another embodiment, the landing dish assembly 110 may be configured to allow for the mechanical and electronic coupling of a UAV with the vehicle integrated UAS. In one embodiment, the landing dish assembly 110 may, for example, have various ports that allow for the connection of electronic cables and interfaces to allow for the transmission and reception of information and power to and from the UAVs associated with the vehicle integrated UAS. In some instances, the landing dish assembly 110 may include a cap (not shown) configured to cover the UAV and/or protect the landing dish. The cap may be configured to attach by hinges, fasteners, hooks, or other connection means. Further, the box cap 106 may be made of any suitable material including, but not limited to, carbon fiber, metal, plastic, wood, glass, combinations thereof, and/or the like. Moreover, the box cap 106 may be configured to prevent the ingress of water and/or particles (e.g., dust, sand, and/or the like). Further, the box cap 106 may be ruggedized, that is, built to mechanically withstand various environmental stresses including, but not limited to, vibration, shock, lightning, fungus, thermal effects, solar effects, humidity effects, and/or the like. In some embodiments, the ruggedization of the box cap 106 may be performed in accordance with one or more standards. For example, the box cap 106 may be in MIL 810g standards for environmental testing or any other suitable standard. In some embodiments, the box cap 106 may include any suitable finish including, but not limited to, paint of any color, polish, and the like.

Figure 11:
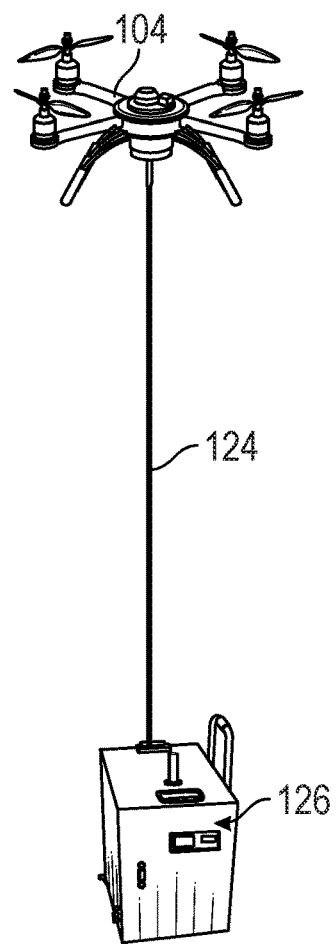
FIG. 11 is a perspective view of a ground control unit and an unmanned aerial vehicle in accordance with one or more embodiments of the disclosure.

Additionally, FIG. 2 shows an example UAV 104, that may be configured to land and take off from a portion (e.g., a top surface 107) of the box cap 106. In various embodiments, as noted, the vehicle integrated UAS 100 may be configured to be UAV agnostic. For example, the vehicle integrated UAS may include a landing dish assembly that is configured to mechanically and/or electronically couple with a variety of different UAVs having different shapes and subcomponents. In this manner, the landing dish assembly 110 may include a surface configured for the UAV 104 to take off and land from the vehicle integrated UAS 100. In some instances, the landing dish assembly 110 may include a conical dish configured to be a landing surface and other components configured to accommodate a tether 124 (e.g., as shown in FIG. 11) for the UAV 104 and drainage from the landing surface, among other functions. In other instances, the landing dish assembly 110 may include another geometric shape landing surface for the UAV 104.

Figure 10:
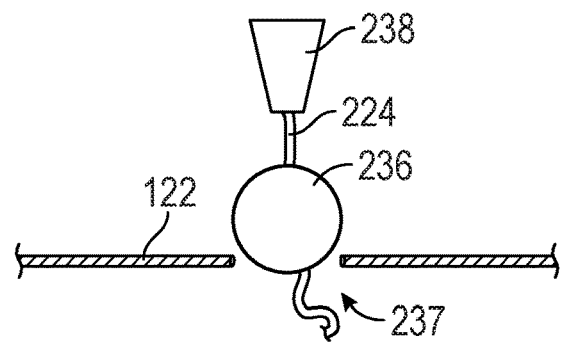
FIG. 10 is a cross sectional view of a landing dish with a tether in accordance with one or more embodiments of the disclosure.

In some embodiments, as shown in FIG. 2, a top perspective view of the vehicle 102 is depicted. In particular, the top surface 107 of the box cap 106 includes a landing dish assembly 110. In various embodiments, the landing dish assembly 110 may include any suitable shape, including, but not limited to, a dish-like shape, a cylindrical shape, a cube-like shape, and/or the like. In one embodiment, the landing dish assembly 110 may include ports (e.g., as depicted in FIG. 10) through which electronic connections (e.g., cables) may be fed through to make connection with the UAVs that attach to the UAS.

In some embodiments, as shown in FIG. 3, the vehicle 102 (e.g., as shown in FIG. 2) includes a vehicle bed 108. The vehicle bed 108 may include a vehicle bed floor 108A and a vehicle bed wall 108B. In some instances, the vehicle bed 108 is a truck bed. That is, a vehicle bed floor 108A may extend between two or more vehicle bed walls 108B. In this manner, the two vehicle bed walls 108B form a partial rim configured to receive a box cap 106 (e.g., as shown in FIG. 3). In other instances, the vehicle bed 108 may be another type of vehicle surface configured to land a UAV.

In some embodiments, the vehicle integrated UAS 100 may be configured to receive data from the UAV 104 and may make various determinations related to a UAV 104 based on the received data including, but not limited to, the location of the UAV 104, the route of the UAV 104, various sensor information from the UAV 104, power levels of the UAV 104, combinations thereof, and/or the like. In some embodiments, one or more processors coupled to non-transitory computer-readable media of the vehicle integrated UAS 100 may be configured to determine a future state (e.g., a future location, a future power level, etc.) of a UAV 104 associated with the vehicle integrated UAS 100 based at least in part on the received data from the UAVs and/or information associated with the vehicle (e.g., location of the vehicle, gas and/or power level of the vehicle, etc.) using an artificial intelligence algorithm.

In particular, the components of the vehicle integrated UAS 100 may employ various AI-based schemes for carrying out various embodiments and/or examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

FIG. 3 shows various subsystems and components that may be part of the vehicle integrated UAS 100, in accordance with example embodiments of the disclosure. In various aspects, embodiments of the disclosure may include a vehicle integrated UAS 100 including the following subsystems and components. In one embodiment, the vehicle integrated UAS 100 may include a first sub-system including a landing dish assembly 110. The landing dish assembly 110 may include a tether 124 and a landing dish 122 configured to mount onto a box cap 106. In one embodiment, a second sub-system includes a box cap 106 with features to receive the landing dish 122 of the landing dish assembly 110. In one embodiment, a third sub-system includes power and communication connection systems (e.g., a ground control unit 126 and/or a tether control unit 130) to receive the components of the first sub-system. In one embodiment, a fourth sub-system includes a flexible attachment system (e.g., coupling mechanism 112) for mounting the second sub-system to a portion of a vehicle such as a box cap 106. In various embodiments, the second sub-system and/or the third sub-system may be similar for vehicles of a given model (e.g., Ford vehicles). In another embodiment, sub-systems may be designed for a given vehicle or be designed to work with a given make of a vehicle (e.g., a Ford F150 and/or a Ford Ranger pickup truck). In particular, the vehicle may have a portion of the vehicle that may be able to couple (e.g., mechanically couple) to the various portions of the vehicle integrated UAS 100.

In some embodiments, as shown in FIG. 3, the landing dish assembly 110 may include a landing dish 122 and mounting tabs 120 disposed on the landing dish. The landing dish assembly 110 may be configured for landing and/or storing a UAV 104. In some instances, the landing dish assembly 110 may attach to a ground control unit 126 via a tether 124. In this manner, the UAV (not shown) attaches to the tether 124 disposed through the landing dish 122. In some instances, the tether 124 extends and retracts through the landing dish 122. In one embodiment, the second sub-system may include a box cap 106, a plurality of mounting bases 116 that may secure the landing dish 122 to the box cap 106 (e.g., the mounting base may include vibration isolators). Further, the second sub-system may include a mounting aperture 114 with at least one mounting aperture groove 118 on the box cap 106. In this manner, the mounting aperture grooves 118 and the mounting aperture 114 may be configured to allow the mounting tabs to pass through. That is, the mounting aperture 114 and the mounting aperture grooves 118 may complement the shape of the landing dish 122 and the mounting tabs 120. In some instances, the landing dish 122 may be placed between the box cap 106 and a vehicle bed 108. The landing dish 122 and the mounting tabs 120 may align with the mounting aperture 114 extending through the box cap 106. The mounting tabs 120 may align with the mounting aperture grooves 118 and the landing dish assembly may be raised through the mounting aperture 114 (also referred to as reversibly couple). The landing dish 122 may rotate to align the mounting tab(s) 120 with the plurality of mounting bases 116. In this manner, the plurality of mounting bases may secure the mounting tab(s) 120 into place by fastener, hook and loop, or other means. In another embodiment, the fourth subsystem may include a coupling mechanism 112. In some instances, the coupling mechanism 112 may include a flexible attachment on the box cap 106 and on the vehicle bed wall 108B. The landing dish assembly may include multiple landing dishes, mounting apertures, mounting tabs, and mounting aperture grooves, among other components. That is, a vehicle may be configured to accept multiple platforms for UAVs. In this manner, the landing dish assembly may be mounted onto any surface of a vehicle (e.g., roof, truck bed, trailer, extension cab, etc.).

Figure 9:
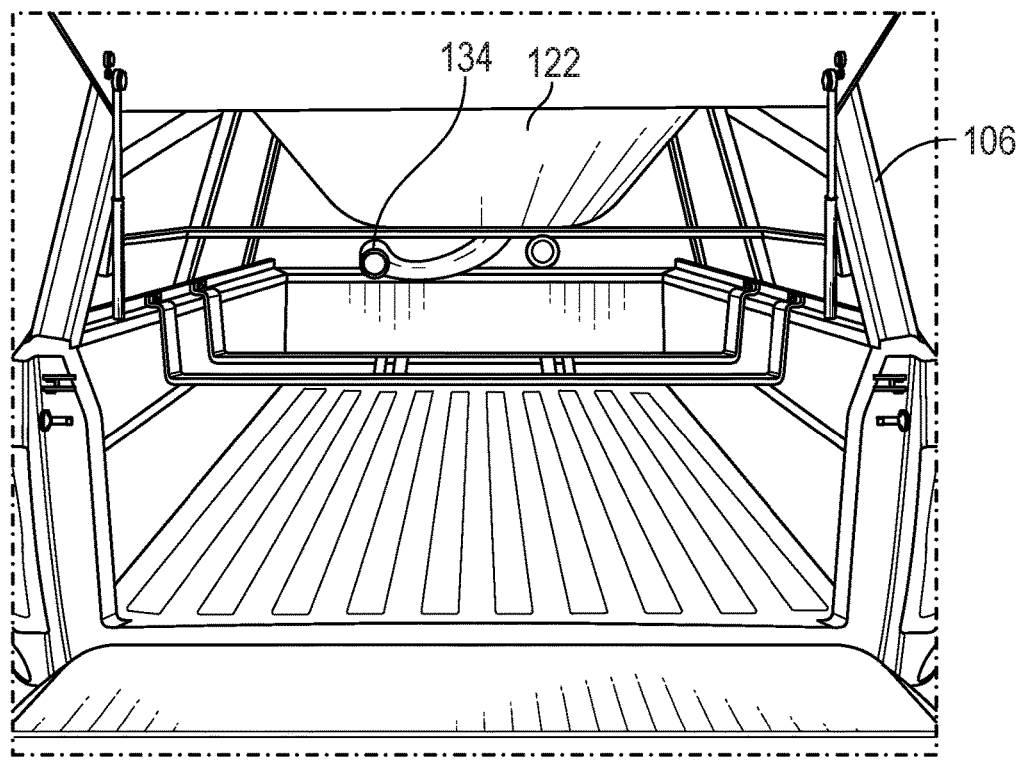
FIG. 9 is a rear view of the vehicle integrated unmanned aircraft system in accordance with one or more embodiments of the disclosure.

In certain embodiments, the landing dish has a radius and a depth. The radius and the depth may be based at least in part on dimensions of the unmanned aerial vehicle. In some instances, the landing dish may be of some shape and have a length and width of similar dimensions to the unmanned aerial vehicle. In some embodiments, as shown in FIGS. 3 and 9, the vehicle integrated UAS 100 includes a drain 134 configured to channel water to a collection pan 150. In some instances, the collection pan 150 may ingress into the box cap 106. In various embodiments, additional mechanisms may be used to ensure waterproofing at various portions of the vehicle integrated UAS and any of its various subsystems. For example, waterproofing may be performed at gaps between landing dish 122 and the box cap 106. That is, any gaps between the landing dish 122 and the box cap 106 may be filled with a seal (not shown). The seal may be permanent or inflatable. In another embodiment, the collection pan 150 may be positioned below the landing dish 122, and may serve to channel water into a drain 134. Moreover, inflatable seals and/or bellows may be positioned around the perimeter of the collection pan 150 and/or box cap 106 interface to absorb shock, seal water, and/or prevent a prop guard (not shown) from hanging up between the collection pan and the cap during installation and/or operation of the vehicle integrated UAS. In particular, the prop guard components may get caught in one or more attachment brackets associated with the various subsystems of the vehicle integrated UAS such as the landing dish 122. Accordingly, one or more recesses in the attachment area may be designed. Alternatively or additionally, the collection pan 150 may be configured to have a down flange (not shown) that may be complementary to the shape of the portion of the landing dish 122 such that the portion of the landing dish 122 may be configured to couple with the collection pan 150. In another embodiment, the prop guard component and the collection pan 150 may be designed such that the probability of a UAV component getting lodged at collection pan 150/box cap 106 interface may be minimized.

Figure 4:
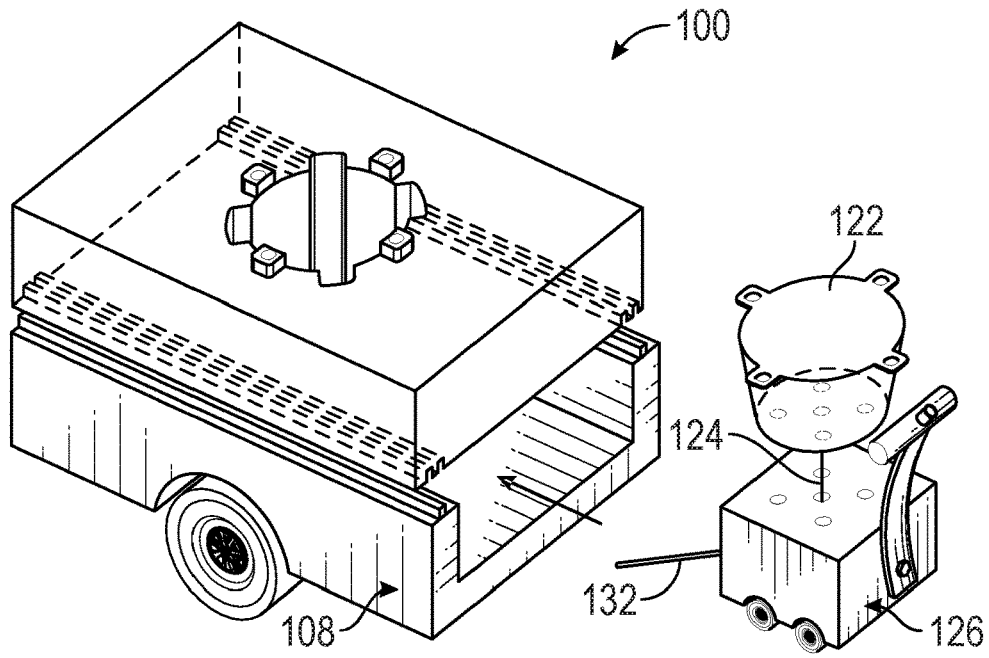
FIG. 4 is a second upper perspective exploded view of the vehicle integrated unmanned aircraft system in accordance with one or more embodiments of the disclosure.

In some embodiments, FIG. 4 depicts how a vehicle integrated UAS may be installed onto a portion of a vehicle bed 108 and box cap 106 (e.g., as shown in FIG. 3). In various embodiments, installing a vehicle integrated UAS 100 onto a portion of a vehicle 102 (e.g., a portion of a pickup truck) may include the ground control unit 126 whereby the landing dish 122 of the vehicle integrated UAS may be secured to a tether 124 and/or a ground control unit 126. Further, installing a vehicle integrated UAS onto the portion of a vehicle may include a handle 127 of the ground control unit 126 is turned to stow the landing dish 122 of the vehicle integrated UAS. The ground control unit 126 may be bound to a trolley 128 (e.g., as shown in FIG. 3) that is configured to transport the ground control unit 126. In another embodiment, installing a vehicle integrated UAS onto the portion of the vehicle 102 may include the landing dish 122 being installed in the ground control unit 126 and positioned onto the vehicle bed 108. In some instances, the landing dish 122 may be attached to the various components by a sliding and locking mechanism. In one embodiment, installing a UAS onto the vehicle may include the landing dish 122 rotated about a vertical axis of the landing dish 122 in order to align mounting tabs 120 to respective mounting aperture grooves 118 of the box cap 106. The landing dish 122 may be moved up with respect to the box cap 106 to allow for mechanical coupling of the box cap 106 with the landing dish 122. Further, the landing dish 122 may be rotated to match the mounting tabs 120 with the plurality of mounting bases 116 on the box cap 106. In some instances, the landing dish 122 may be secured to the box cap 106. For example, the landing dish 122 may be secured using one or more screws or nails. Further, installing a UAS onto the vehicle may include utility cable 132. In some instances, the utility cable 132 includes UAV power and communication cables configured to be plugged into one or more vehicle connections, described below. In various embodiments, the uninstallation of a UAS from the vehicle, may be achieved by performing the mechanisms described above, executed in reverse order.

Figure 5:
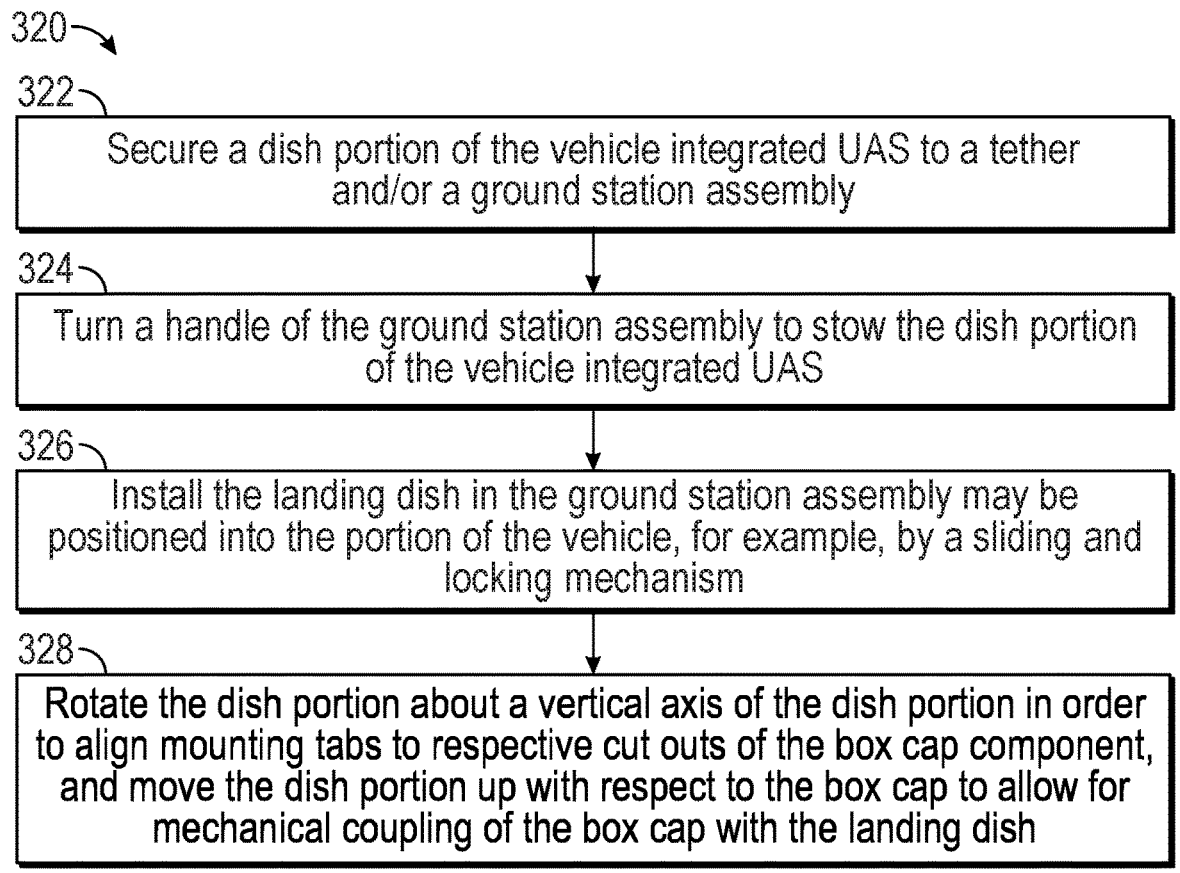
FIG. 5 is a diagram of a process flow for installing a UAS to a portion of a vehicle in accordance with one or more embodiments of the disclosure.

FIG. 5 shows a diagram 320 of a process flow for installing a UAS to a portion of a vehicle, in accordance with example embodiments of the disclosure. At block 322, a landing dish 122 of the vehicle integrated UAS may be secured to a tether and/or a ground station assembly. As noted, the tether may be configured to provide power to the UAVs associated with the vehicle integrated UAS. Further, the ground station assembly may be used to transfer the landing dish 122 to a portion of the vehicle (e.g., a truck bed area of a pickup truck).

At block 324, a handle of the ground station assembly may be turned to stow the landing dish of the vehicle integrated UAS. In particular, the handle may serve to stow and/or release the landing dish of the vehicle integrated UAS in order to install the landing dish into the box cap which may be coupled to the portion of the vehicle.

At block 326, the landing dish may be installed in the ground station assembly and may be positioned into the portion of the vehicle, for example, by a sliding and locking mechanism. In particular, the ground station assembly may be configured to at least partially insert itself and the dish mechanism below the box cap of the vehicle integrated UAS which may have been previously installed into the vehicle.

At block 328, the landing dish may be rotated about a vertical axis of the landing dish in order to align mounting tabs to respective cut outs of the box cap, and the landing dish may be moved up with respect to the box cap to allow for mechanical coupling of the box cap with the landing dish. Moreover, one or more electrical connections and/or mechanical connections (e.g., tethers, cables, etc.) may be connected to the UAVs through one or more ports of the box cap 106 (e.g., as shown in FIG. 2), the landing dish assembly 110 and/or or any other portion of the vehicle integrated UAS 100.

Figure 6:
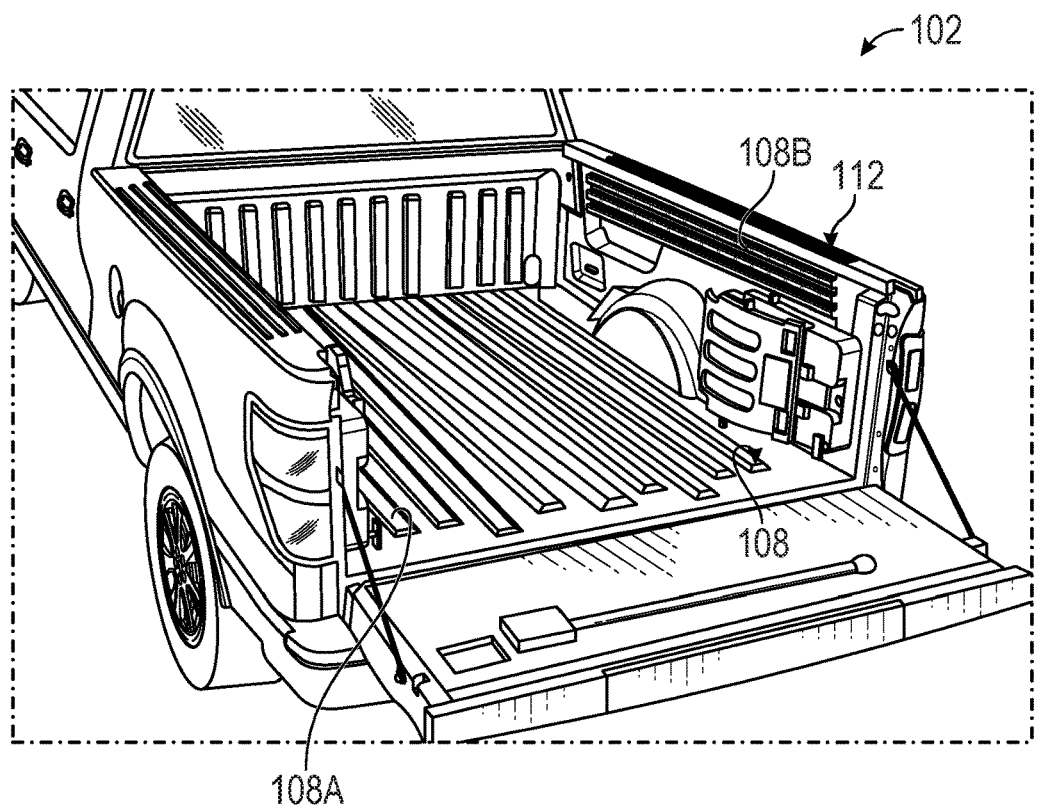
FIG. 6 is a rear view of a vehicle in accordance with one or more embodiments of the disclosure.
Figure 7:
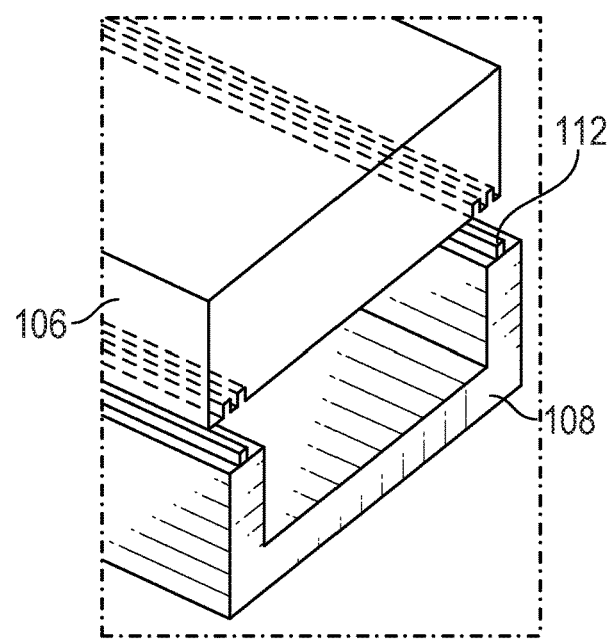
FIG. 7 is a partial view of a vehicle bed and a box cap in accordance with one or more embodiments of the disclosure.
Figure 8:
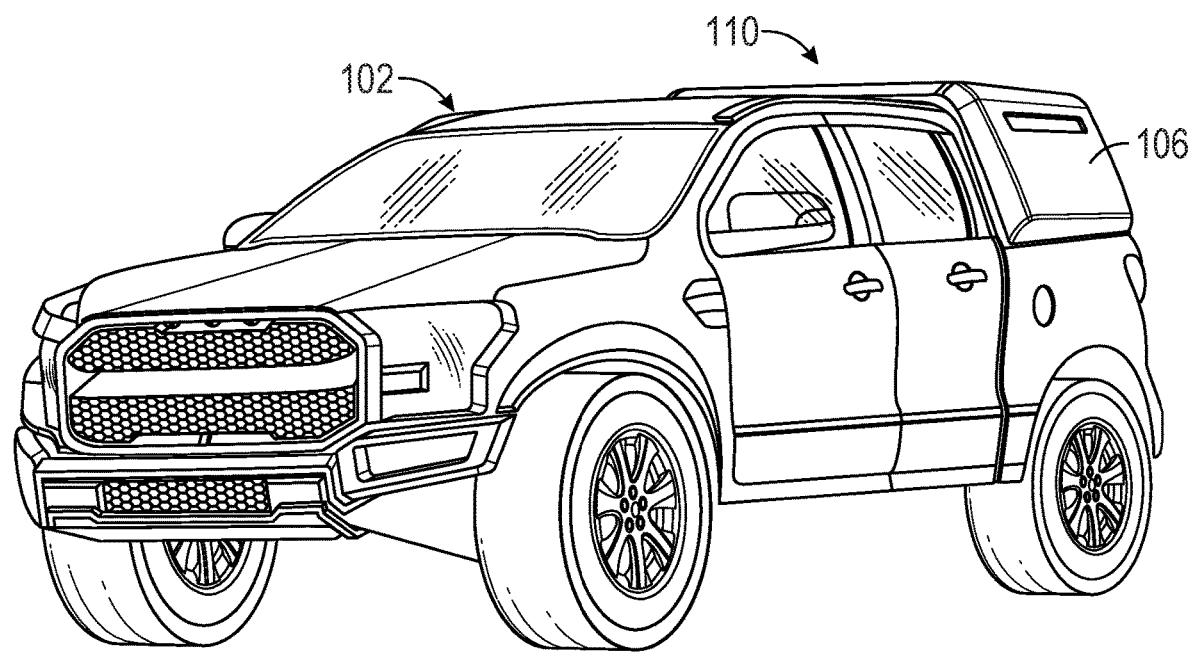
FIG. 8 is a front perspective view of the vehicle integrated unmanned aircraft system in accordance with one or more embodiments of the disclosure.

In some embodiments, as shown in FIGS. 6-9, the box cap 106 is configured to mount onto the vehicle bed 108 via the coupling mechanism 112. In particular, FIG. 6 depicts one embodiment of a portion of a vehicle 102 such as a pickup truck. The vehicle 102 may include the vehicle bed 108, the vehicle bed floor 108A, the vehicle bed wall(s) 108B, and the coupling mechanism 112 (e.g., as shown in FIG. 7) disposed thereon. In some instances, the box length between the two vehicle bed walls 108B of the pickup truck bed 108 may be a predetermined value, such as between approximately 58 inches and approximately 65 inches. In some instances, the length between two bed walls 108B may be less than 58 inches or more than 65 inches. As shown in FIG. 7, the portion of the vehicle may include a coupling mechanism 112 (e.g., grooved ridges) that may be configured to couple with a corresponding complementary portion of the box cap 106. Further, as shown in FIG. 8, the vehicle 102 may be configured to operate with the vehicle integration system 100 (e.g., including the box cap 106), thereby allowing a user (e.g., a border patrol agent, a fire fighter, a police offer, a civilian, or the like) to operate one or more UAVs that may land, may be stowed, and may take off from the vehicle integration system.

In some embodiments, as shown in FIGS. 10 and 11, the vehicle integrated system includes a tether 224 extending through a surface of the landing dish 122. In some instances, the tether 224 includes a tether stopper 236 (e.g., a bobble) configured to halt a tether hook 238 from falling within the box cap 106. For example, the tether stopper 236 may guide along the tether 224 towards the landing dish 122 as the tether 224 is pulled from within the box cap 106. The tether hook 238 may latch onto a UAV. The tether hook 238 may include data and power connections for the UAV. In some instances, a user may require occasional access to the UAV for maintenance and inspection which may necessitate removing the UAV from the tether. In some instances, the tether hook 238 may secure the tether 224 to a portion of the landing dish 122 of the landing mechanism such that the tether 224 does not need to be retrieved from inside the vehicle 102 (e.g., from the bed of a pickup truck). In other instances, the tether stopper 236 may include a bobble that is configured to be installed on a tether 224 near the tether hook 238 (e.g., the section of the tether that can couple with a UAV) that prevents the tether stopper 236 from falling through an opening 237 of the landing dish. Alternatively or additionally, a cap (not shown) may be installed over the tether opening near the portion of the landing dish to achieve the same purpose. In such embodiments, the instrument or the cap may prevent the tether from falling inside the vehicle (e.g., onto the floor of a pickup truck or inside a van, etc.) during use or maintenance of the UAS.

FIG. 11 illustrates a tether 124 attached to the UAV 104 that may be part of a vehicle integrated UAS 100 in accordance with example embodiments of the disclosure. FIG. 11 shows a UAV 104 may be connected to a ground control unit 126 via a tether 124. Further, the ground control unit 126 may be configured to be inside a vehicle 102 to which the vehicle integrated UAS 100 is coupled. Alternatively or additionally, the ground control unit 126 may be motorized, and may be gas or battery powered. In one embodiment, the ground control unit 126 may be configured to provide power and/or communications to the UAV 104 through the tether 124 and utility cable 132. In another embodiment, ground control unit 126 may be configured to include multiple tethers each tether similar to tether 124, and connected to multiple UAVs each similar, but not necessarily identical to UAV 104.

As previously noted, in various embodiments, the vehicle may include one or more connections. In particular, the connections may include power and electronic connections that may be configured to allow for a plug and play operation of the UAVs of the UAS. In particular, in an embodiment, the landing dish assembly and the UAS may represent two nodes in a vehicle network (e.g., an Ethernet network, a control area network, CAN, and/or the like). Further, when the UAS is mounted and installed in the vehicle, the landing dish assembly and/or the UAS may notify a synchronization module (e.g., sync module) of the vehicle network to indicate to the vehicle network of their presence. In particular, the landing dish assembly and/or the UAS may notify a synchronization module (e.g., sync module) of the vehicle network using any suitable cast message or using any suitable discovery protocol. Further, the vehicle network may (e.g., using the sync module) periodically scan (e.g., every second, every 10 seconds, every minute, etc.) for such messages or may use any suitable discovery protocol to identify the presence of the landing dish assembly and/or the UAS. In another embodiment, when the UAS and/or the landing dish assembly is unmounted and/or uninstalled in accordance with safety and electronic considerations, the landing dish assembly and/or the UAS can notify the synchronization module (e.g., sync module) of the vehicle devices about exiting the vehicle network; otherwise, the synchronization module can monitor the landing dish assembly and/or the UAS to determine their status.

In various embodiments, the UAS application, updates, and/or portions of software associated with the UAS and/or the vehicles may be downloaded using any suitable technique (e.g., downloaded over a wired or wireless connection including the internet and/or over-the-air (OTA) software update transmissions). In another embodiment, multiple UAS applications running on multiple devices (e.g., multiple vehicle devices) may be updated in a batch process. In particular, for the synchronization module, UASs manufactures may use a proprietary protocol to communicate with UASs, which may result in a given synchronization module application associated with a given manufacturer. In another embodiment, a UAS app installed on a given vehicle device may include a synchronization module that may recognize a compatible UAS when the UAS is installed in the vehicle. Further, the UAS app may enable users to interact with it via a dedicated human-machine interface, HMI (e.g., an HMI tailored for a given synchronization module). In another embodiment, if there are no UASs connected to a given vehicle, the synchronization module may disable and/or hide the application from the HMI, for example, an HMI associated with the navigation system of the vehicle.

Various embodiments of the disclosure may confer various advantages, including, but not limited to, increasing the aesthetic and functional appeal of the system to users, increasing the portability of the system to support more use cases and applications, reduced engineering complexity as the system hardware and/or software may need to be to be engineered once and be vehicle and/or UAV agnostic.

Figure 12:
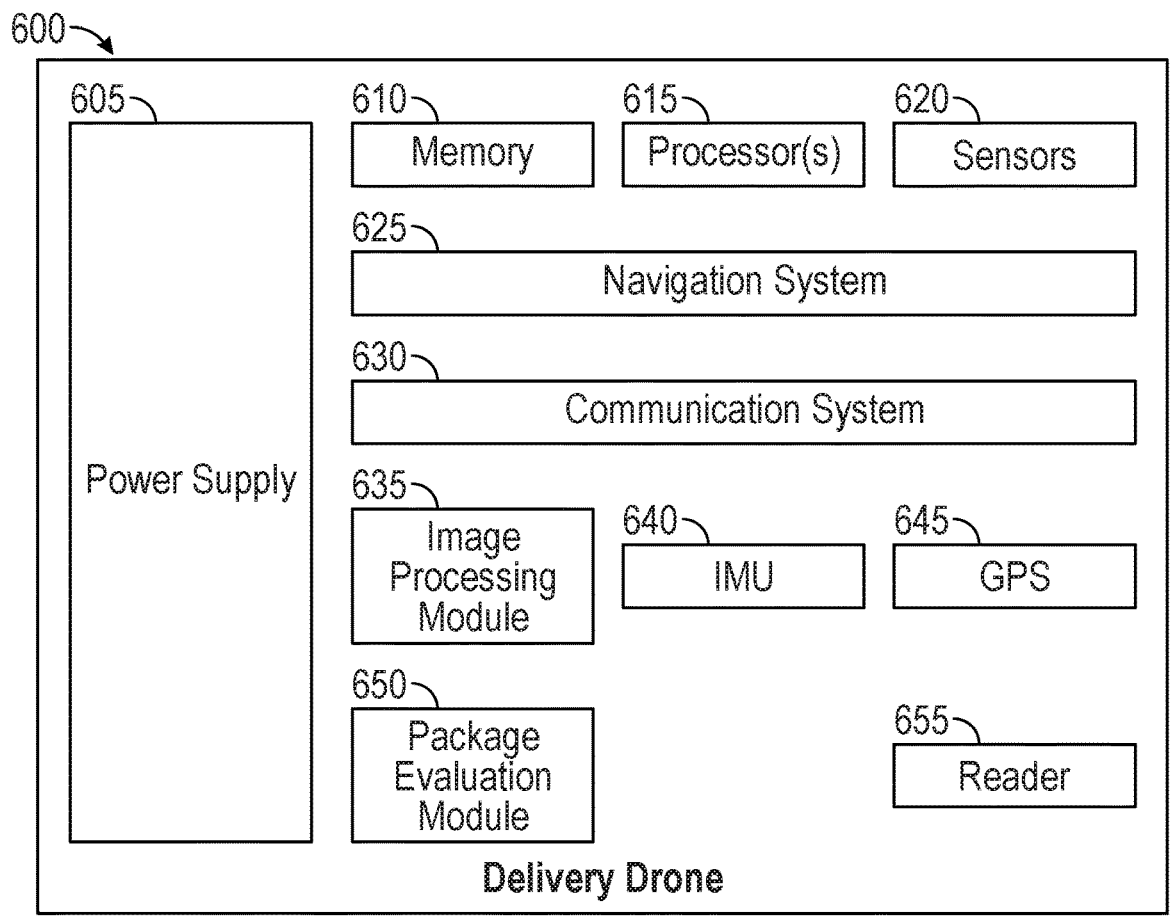
FIG. 12 illustrates a set of components within an unmanned aerial vehicle according to one or more embodiments of the disclosure.

FIG. 12 represents a diagram showing a set of components associated with a UAV, according to various embodiments of the disclosure. In particular, the UAV or drone may represent any suitable UAV and may be configured to operate in connection with the vehicle integrated UAS described herein. The UAV may include a power supply 605 (e.g., battery), a memory 610 (e.g., volatile memory and/or nonvolatile memory), processor(s) 615 for executing instructions and performing calculations, sensors 620, navigation system 625, communication system 630, image processing module 635, inertial measurement unit (IMU) 640, global positioning system (GPS) 645, package evaluation module 650, and fingerprint reader 655.

In one embodiment, the communication system 630 may also include one or more communications interfaces for communicating with various computing entities (e.g., the vehicle devices, other UAVs, other vehicles, control centers, and the like), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communication system 630 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Processor(s) 615 are the main processors of the drone which may include application processors, various coprocessors, and other dedicated processors for operating the drone. Processor(s) 615 may be communicably coupled with memory 610 and configured to run the operating system, user interfaces, sensors 620, navigation system 625, communication system 630, image processing module 635, and/or other components. In some embodiments, processor (s) 615 may include multiple dedicated or shared processors configured to perform signal processing (e.g. baseband processors for cellular communications), implement/manage real-time radio transmission operations, of the drone, make navigation decisions (e.g., compute flight paths, implement obstacle avoidance routines, etc.). These processors along with the other components may be powered by power supply 605. The volatile and nonvolatile memories found in various embodiments may include storage media for storing information such as processor-readable instructions, data structures, program modules, or other data. Some examples of information that may be stored include basic input/output systems (BIOS), operating systems, and applications.

Sensors 620 may be used to detect events or changes in the surrounding environment and produce a corresponding signal that can be acted upon by various components within the delivery drone or transmitted to other parts of the drone delivery infrastructure. In some embodiments, sensors 620 may include one or more of the following: a microphone, a camera, a thermostat, an accelerometer, light sensors, motion sensors, moisture sensors, fingerprint readers, retinal scanners, chemical sensors, scales, LIDAR, RADAR, and the like. Several of these sensors, for example, may be used as part of navigation system 625. Other sensors may be used to evaluate the package or record the environment. As another example, battery life can vary significantly based on temperature. As such, the temperature reading from the thermostat may be used to more accurately predict the range of the delivery drone. In some embodiments, the signal generated by the microphone can be used to determine the noise level of the surrounding environment and to record a voice message or identification from a user inserting or removing a package. Still yet, sensors 620 may include credit card readers for accepting payments, including Bluetooth or near field communication (NFC) systems.

Navigation system 625 can be responsible for determining the flight path of the delivery drone. In some embodiments, high-level instructions or pick-up/drop-off destinations can be communicated to the drone via communication system 630. Navigation system 625 may receive inputs from multiple sensors 620 (e.g., accelerometers, gyroscopes, LIDAR, RADAR, etc.), image processing module 635, inertial measurement unit (IMU) 640, and/or GPS 645 to determine optimal flight paths, detect and avoid objects, coordinate with other nearby drones using communication system 630, and the like. For example, IMU 640 can determine the delivery drone's orientation and velocity.

According to one embodiment, the navigation system 625 may include location determining aspects, devices, modules, functionalities, and/or similar words used herein interchangeably. For example, the navigation system 625 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the drone's position in connection with a variety of other systems, including cellular towers, Wi-Fi access points, and/or the like. Similarly, the navigation system 625 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In another aspect, the drone may include a package evaluation module 650 that can use input from sensors 620, image processing module 635, and/or fingerprint reader 655 to determine whether to accept the package from the user. For example, package evaluation module 650 may request user authentication via fingerprint reader 655 and/or another biometric reader. If the reading does not match the record on file (e.g., from an initial registration with the delivery system), then the package evaluation module 650 may determine to not accept the package. As another example, a scale may be used to measure the weight of the package. If package evaluation module 650 determines that the package exceeds a maximum weight for the delivery drone, then the package may be denied.

Package evaluation module 650 may use multiple different types of sensors 620 to make a determination. For example, package evaluation module 650 may use the image processing module 635 to identify the size and/or type of package, various types of chemical sensors to detect possible explosives, barcode readers to identify an originator/packer, as well as others. In some embodiments, the package analysis governed by package evaluation module 650 could be a combination of: X-Ray of packages and/or chemical sensors to ensure hazardous packages are not sent. In some embodiments, the delivery drones may also include a display (e.g., a liquid crystal display) or interface with a mobile device (e.g., via a personal area network, Bluetooth, cellular network, etc.) to confirm with the user that no hazardous packages (e.g., listed on the display) are included in the shipment. If no confirmation is received, the package evaluation module 650 may refuse the delivery.

Figure 13:
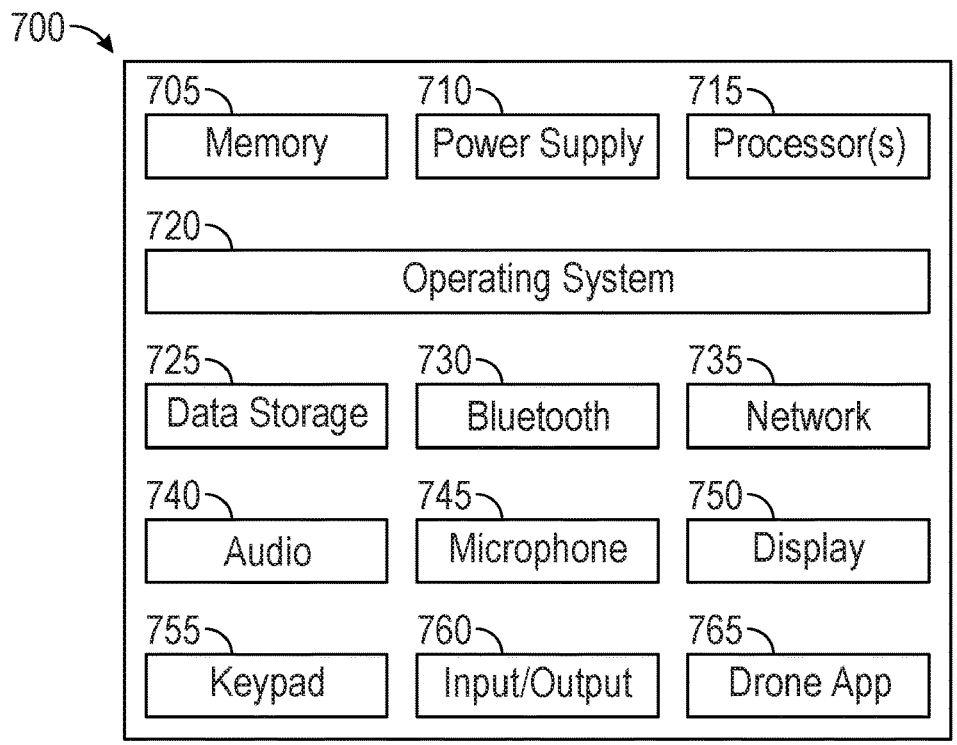
FIG. 13 illustrates a set of components within a mobile device with a UAV management application in accordance with one or more embodiments of the disclosure.

FIG. 13 illustrates a set of components within a mobile device with a drone management application according to various embodiments of the disclosure. The drone management application may be used to configure aspects of the UAVs in association with the aerial components, winches, and/or ground components described above. As shown in FIG. 13, mobile device 700 may include memory 705 (e.g., volatile memory and/or nonvolatile memory), power supply 710 (e.g., battery), processor(s) 715 for executing processing instructions, and operating system 720. Additional components such as data storage component 725 (e.g., hard drive, flash memory, memory card, etc.), one or more network interfaces (e.g., Bluetooth Interface 730; and network communication interface 735, which enables the mobile phone to communicate by transmitting and receiving wireless signals using licensed, semi-licensed or unlicensed spectra over a telecommunications network), audio interface 740, microphone 745, display 750, keypad or keyboard 755, and other input and/or output interfaces 760 (e.g. a fingerprint reader or other biometric sensor/security feature). The various components of a mobile device may be interconnected via a bus.

Processor(s) 715 are the main processors of mobile device 700, and they may include application processors, baseband processors, various coprocessors, and other dedicated processors for operating mobile device 700. For example, an application processor can provide the processing power to support software applications, memory management, graphics processing, and multimedia. An application processor may be communicably coupled with memory 705 and configured to run the operating system, the user interface, and the applications stored on memory 705 or data storage component 725. A baseband processor may be configured to perform signal processing and implement/manage real-time radio transmission operations of mobile device 700. These processors along with the other components may be powered by power supply 710. The volatile and nonvolatile memories found in various embodiments may include storage media for storing information such as processor-readable instructions, data structures, program modules, or other data. Some examples of information that may be stored include basic input/output systems (BIOS), operating systems, and applications.

In accordance with some embodiments, drone application 765 may be installed on mobile device 700. Drone application 765 may be used to register a user, confirm pick-up/drop-off locations and/or times, convey the current location of a delivery drone, provide real-time video or images from a delivery done, reschedule pick-up/drop-off times/locations, and the like.

Figure 14:
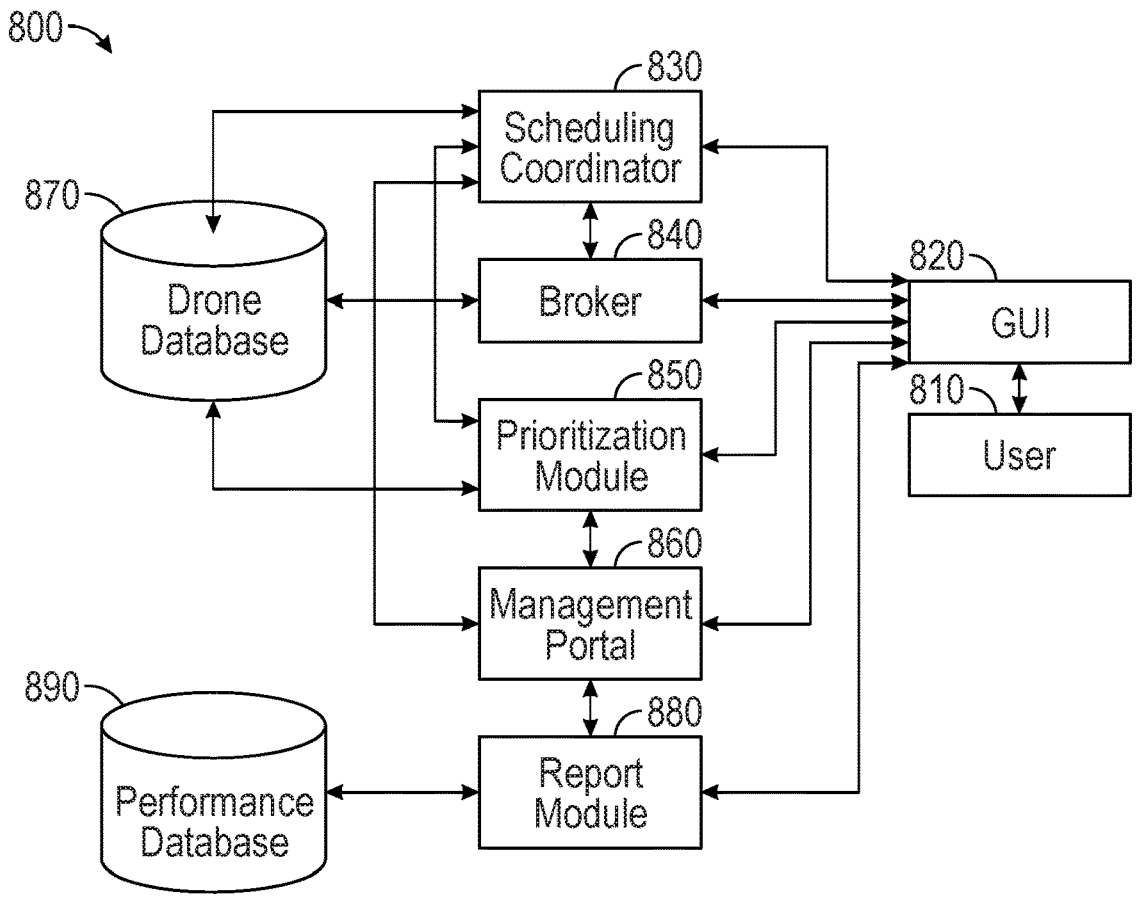
FIG. 14 illustrates a set of components of a UAV management engine used for scheduling and monitoring delivery drones in accordance with one or more embodiments of the disclosure.

FIG. 14 illustrates a set of components 800 of a drone management engine used for scheduling and monitoring delivery drones according to various embodiments of the present technology. As illustrated in FIG. 14, drone management engine may allow user 810 to interface with GUI 820 to request a drone pick-up. GUI 820 (e.g., generated via mobile app 765) can then transmit the request to scheduling coordinator 830. Scheduling coordinator 830 is responsible for efficiently scheduling the delivery drone. Scheduling coordinator 830 may base selection of the delivery drone from the fleet based on current drone locations, package information, user preferences, battery power, weather conditions, and/or other preference or constraint.

In some cases, scheduling coordinator 830 may need to request the services of broker 840 or prioritization module 850 to determine which drones should be allocated to which request. For example, in some embodiments, the drones may be owned and operated by multiple different operators. As such, broker 840 can take bids for the current job request. The bids can be received through various automated auctions (e.g., reverse auction, Dutch auction, blind auction, etc.). In other cases, preferred providers may be offered a right of first refusal on a fixed price. Still yet, in some embodiments, scheduling coordinator 830 may provide a small set of drones determined to be a good fit for the delivery request. Once these are received, broker 840 can determine which drone to use based on bidding, next in queue, and the like. Using these and other techniques, broker 840 can identify to scheduling coordinator 830 a delivery drone that can complete the delivery. Once selected, scheduling coordinator 830 can use various communications (e.g., wireless networks) to convey the instructions to the selected delivery drone.

When multiple requests are received, scheduling coordinator 830 may use prioritization module 850 to determine a priority for completing the requests. Prioritization module 850 can use factors such as, but not limited to, user priorities, current wait times, drone locations, and the like. In some cases, one or more governmental agencies or regulators can issue requests for one or more drones to deviate from their delivery schedule. For example, when a drone is schedule to cross country borders, a request for deviation to comply with customs inspections may be processed using management portal 860.

As another example, firefighter or police agencies may set up temporary or permanent no-fly zones. Still yet, police may request that a delivery drone land for execution of a search warrant or other reasons. In some embodiments, the drone delivery system may use features of the communications network to prioritize or enhance communications. For example, the drone delivery system may use the E911 system in a cellular network to effectively deliver needed supplies to first responders with the delivery drones. Examples of supplies may include drugs (e.g. anti-venom), neutralizing agent (e.g., to Haz-Mat team), water, clothes, tools, and the like. All of these requests are handed through management portal 860.

Drone database 870 logs the current status of each drone. In addition, some drones provide streaming video or images of selected (e.g., pick-up and drop-off) parts of their flight. These media may be stored in drone database 870. In addition, the drone management engine 140 may include report module 880 for generating reports based on performance data logged in performance database 890.

Figure 15:
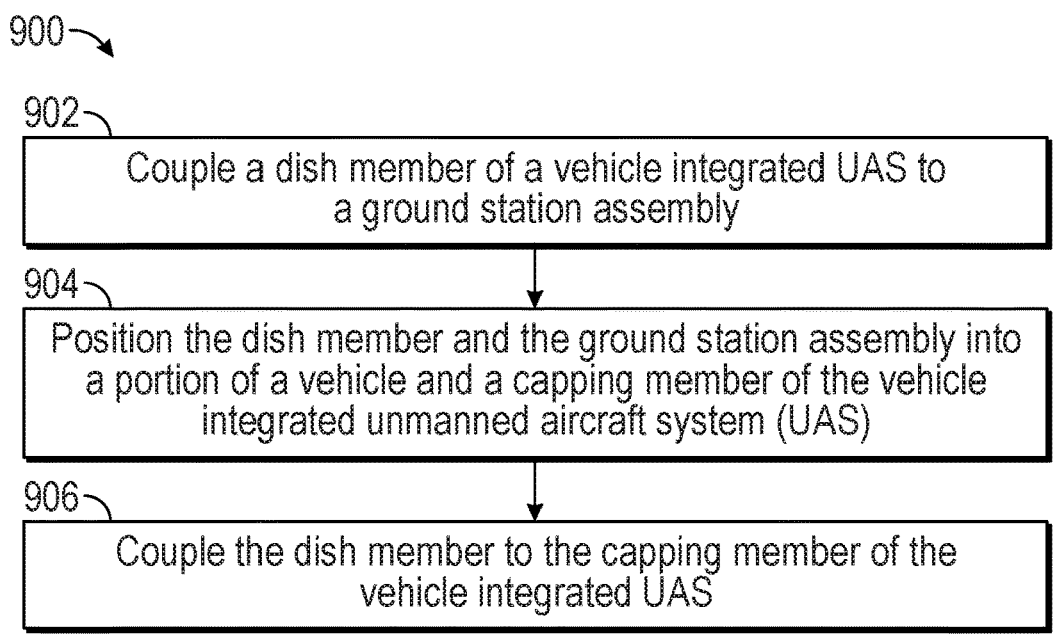
FIG. 15 shows a diagram of a process flow for vehicle integration of a UAS in accordance with one or more embodiments of the disclosure.

FIG. 15 shows a diagram of a process flow for vehicle integration of a UAS, in accordance with example embodiments of the disclosure. At block 902, a landing dish of a vehicle integrated UAS may be coupled to a ground station assembly. In one embodiment, a landing dish of the vehicle integrated UAS may be secured to a tether and/or a ground station assembly. In another embodiment, a handle of the ground station assembly may be turned to stow the landing dish of the vehicle integrated UAS.

At block 904, the landing dish and the ground station assembly may be positioned into a portion of a vehicle and a capping member (also referred to as a "box cap") of the vehicle integrated UAS. In one embodiment, the installation of the landing dish in the ground station assembly may be performed by positioning the landing dish and the ground station assembly into the portion of the vehicle, for example, by a sliding and locking mechanism.

At block 906, the landing dish may be coupled to the capping member of the vehicle integrated UAS. For example, the landing dish may be rotated about a vertical axis of the landing dish in order to align mounting tabs to respective cut outs of the box cap, and move the landing dish up with respect to the box cap to allow for mechanical coupling of the box cap with the landing dish.

One or more operations of the methods, process flows, and use cases of FIGS. 1-15 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-15 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-15 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Example Embodiments of the Disclosure May Include One or More of the Following Examples:

In example 1, a vehicle integrated unmanned aircraft system is described. The system may include: a landing dish assembly configured to reversibly couple to a portion of a vehicle; a ground control unit configured to mount within the vehicle, the ground control unit configured to couple to an unmanned aerial vehicle; and one or more communication connections configured to electronically couple with one or more connections of the vehicle and the unmanned aerial vehicle.

In example 2, the landing dish may include mounting tabs that are configured to couple to a box cap mounted onto the vehicle.

In example 3, the system may include a box cap, the box cap comprising a coupling mechanism configured to selectively mount to the vehicle.

In example 4, the vehicle may include a pickup truck, a truck, a car, a van or a bus.

In example 5, the landing dish may have a radius and a depth, the radius and depth based at least in part on dimensions of the at least one UAV.

In example 6, the ground control unit may include a tether configured to mechanically latch onto the unmanned aerial vehicle.

In example 7, the tether may be further configured to provide power to the UAV.

In example 8, the one or more communication connections may be configured to communicate information about the unmanned aerial vehicle to one or more vehicle integrated unmanned aircraft systems associated with the vehicle.

In example 9, a system is described, the system including: a vehicle; a landing dish assembly coupled to the vehicle, wherein the landing dish assembly is configured to receive an unmanned aerial vehicle; a ground control unit selectively mounted within the vehicle, the ground control unit comprising a tether operably attached to the unmanned aerial vehicle; and one or more communication connections within the tether configured to electronically communicate with one or more connections of the vehicle and the unmanned aerial vehicle.

In example 10, the landing dish may include a landing dish; and at least one mounting tab disposed on the landing dish, wherein the at least one mounting tab is configured to couple to a mounting base on the vehicle.

In example 11, the vehicle may include a vehicle bed; a box cap disposed on the vehicle bed; a coupling mechanism disposed on the vehicle bed and the box cap, wherein the coupling mechanism is configured to secure the box cap to the vehicle bed.

In example 12, the vehicle may include a pickup truck, a truck, a car, a van or a bus.

In example 13, the landing dish may have a radius and a depth, the radius and depth based at least in part on dimensions of the at least one UAV.

In example 14, the ground control unit comprises a utility cable configured to mechanically couple to the unmanned aerial vehicle.

In example 15, a method is described. The method may include: coupling a landing dish of a vehicle integrated UAS to a ground station assembly; positioning the landing dish and the ground station assembly into a portion of a vehicle and a capping member of the vehicle integrated UAS; coupling the landing dish to the capping member of the vehicle integrated UAS.

In example 16, the coupling of the landing dish of the vehicle integrated UAS to the ground station assembly further comprises stowing the landing dish to the ground station assembly by adjusting a handle of the ground station assembly.

In example 17, the coupling of the landing dish of the vehicle integrated UAS may further include coupling the landing dish to a tether.

In example 18, the coupling of the landing dish to the capping member may further include aligning mounting tabs of the landing dish to respective cut outs of the capping member.

In example 19, the aligning of the mounting tabs of the landing dish may include at least one of rotating the landing dish or vertically translating the landing dish.

In example 20, the method of example 15 may further include connecting one or more communication cables of the vehicle integrated UAS with one or more connections of the vehicle.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle integrated unmanned aircraft system, comprising:
    a landing dish assembly configured to reversibly couple to a portion of a vehicle, wherein the landing dish assembly has a radius and a depth, the radius and depth based at least in part on dimensions of an unmanned aerial vehicle, and wherein the landing dish assembly further comprises a landing dish and mounting tabs on the landing dish that are configured to couple to a box cap mounted onto the vehicle, and wherein the box cap includes a mounting aperture configured to receive the landing dish assembly, and wherein the mounting aperture includes one or more mounting aperture grooves and one or more mounting bases,
    wherein the landing dish is configured to be rotated about a vertical axis of the landing dish to align the mounting tabs to the one or more mounting aperture grooves,
    and wherein the landing dish is configured to be further rotated about the vertical axis of the landing dish to align the mounting tabs to the plurality of mounting bases to removably secure the landing dish to the box cap;
    a ground control unit configured to mount within the vehicle, the ground control unit configured to couple to the unmanned aerial vehicle; and
    one or more communication connections configured to electronically couple with one or more connections of the vehicle and the unmanned aerial vehicle.

2. The vehicle integrated unmanned aircraft system of claim 1, wherein the vehicle comprises a pickup truck, a truck, a car, a van or a bus.

3. The vehicle integrated unmanned aircraft system of claim 1, the ground control unit comprising a tether configured to mechanically latch onto the unmanned aerial vehicle, wherein the tether is configured to provide power to the unmanned aerial vehicle.

4. The vehicle integrated unmanned aircraft system of claim 1, wherein the one or more communication connections are configured to communicate information about the unmanned aerial vehicle to one or more vehicle integrated unmanned aircraft systems associated with the vehicle.

5. A vehicle integrated unmanned aircraft system (UAS), comprising:
    a vehicle;
    a landing dish assembly coupled to the vehicle, wherein the landing dish assembly is configured to receive an unmanned aerial vehicle, wherein the landing dish assembly has a radius and a depth, the radius and depth based at least in part on dimensions of the unmanned aerial vehicle, and wherein the landing dish assembly further comprises a landing dish and mounting tabs on the landing dish that are configured to couple to a box cap mounted onto the vehicle, and wherein the box cap includes a mounting aperture configured to receive the landing dish assembly, and wherein the mounting aperture includes one or more mounting aperture grooves and one or more mounting bases,
    wherein the landing dish is configured to be rotated about a vertical axis of the landing dish to align the mounting tabs to the one or more mounting aperture grooves,
    and wherein the landing dish is configured to be further rotated about the vertical axis of the landing dish to align the mounting tabs to the plurality of mounting bases to removably secure the landing dish to the box cap;
    a ground control unit selectively mounted within the vehicle, the ground control unit comprising a tether operably attached to the unmanned aerial vehicle; and
    one or more communication connections within the tether configured to electronically communicate with one or more connections of the vehicle and the unmanned aerial vehicle.

6. The vehicle integrated unmanned aircraft system of claim 5, wherein the vehicle comprises:
    a vehicle bed;
    the box cap disposed on the vehicle bed; and
    a coupling mechanism disposed on the vehicle bed and the box cap, wherein the coupling mechanism is configured to secure the box cap to the vehicle bed.

7. The vehicle integrated unmanned aircraft system of claim 5, wherein the vehicle comprises a pickup truck, a truck, a car, a van or a bus.

8. The vehicle integrated unmanned aircraft system of claim 5, wherein the ground control unit comprises a utility cable configured to mechanically couple to the unmanned aerial vehicle.

9. A method, comprising:
    coupling a landing dish of a vehicle integrated unmanned aircraft system (UAS) to a ground station assembly, wherein a landing dish assembly comprises the landing dish and mounting tabs on the landing dish that are configured to couple to a capping member of the vehicle integrated UAS;
    positioning the landing dish and the ground station assembly into a portion of a vehicle and the capping member of the vehicle integrated UAS, and wherein the capping member includes a mounting aperture configured to receive the landing dish assembly, and wherein the mounting aperture includes one or more mounting aperture grooves and one or more mounting bases, wherein the landing dish is configured to be rotated about a vertical axis of the landing dish to align the mounting tabs to the one or more mounting aperture grooves, and wherein the landing dish is configured to be further rotated about the vertical axis of the landing dish to align the mounting tabs to the plurality of mounting bases to removably secure the landing dish to the capping member; and coupling the landing dish to the capping member of the vehicle integrated UAS.

10. The method of claim 9, wherein the coupling of the landing dish of the vehicle integrated UAS to the ground station assembly further comprises stowing the landing dish to the ground station assembly by adjusting a handle of the ground station assembly.

11. The method of claim 9, wherein the coupling of the landing dish of the vehicle integrated UAS further comprises coupling the landing dish to a tether.

12. The method of claim 9, wherein the method further comprises connecting one or more utility cables of the vehicle integrated UAS with one or more connections of the vehicle.

13. The vehicle integrated unmanned aircraft system of claim 1, wherein the one or more mounting aperture grooves are configured to allow the mounting tabs of the landing dish assembly to pass through the mounting aperture, wherein the landing dish assembly is configured to removably affix to the box cap through an engagement of the one or more mounting bases and the mounting tabs.

14. The vehicle integrated unmanned aircraft system of claim 1, wherein the ground control unit is located underneath the box cap and the mounting aperture.

15. The vehicle integrated unmanned aircraft system of claim 14, wherein a tether connects the ground control unit to the unmanned aerial vehicle through the landing dish assembly in the box cap.

16. The vehicle integrated unmanned aircraft system of claim 1, wherein the landing dish assembly includes a drain tube.

* * * * *